United States Patent
Jung et al.

(10) Patent No.: US 11,043,034 B2
(45) Date of Patent: Jun. 22, 2021

(54) IMAGE OUTPUT DEVICE

(71) Applicant: LG Electronics Inc., Seoul (KR)

(72) Inventors: Dukyung Jung, Seoul (KR); Yeonsoo Kim, Seoul (KR); Kihyung Lee, Seoul (KR); Sunghwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 16/517,205

(22) Filed: Jul. 19, 2019

(65) Prior Publication Data

US 2020/0027273 A1    Jan. 23, 2020

(30) Foreign Application Priority Data

Jul. 20, 2018    (WO) ................ PCT/KR2018/008249

(51) Int. Cl.
*G06T 19/00*    (2011.01)
*G06T 17/05*    (2011.01)
*G08G 1/0968*    (2006.01)

(52) U.S. Cl.
CPC ............ *G06T 19/006* (2013.01); *G06T 17/05* (2013.01); *G08G 1/096855* (2013.01)

(58) Field of Classification Search
CPC .. G06T 19/006; G06T 17/05; G08G 1/096855
See application file for complete search history.

(56) References Cited

U.S. PATENT DOCUMENTS

| | | | | |
|---|---|---|---|---|
| 2005/0261826 | A1* | 11/2005 | Kurosawa | .......... G01C 21/3682 701/429 |
| 2010/0292886 | A1* | 11/2010 | Szczerba | ............... G01S 13/723 701/31.4 |
| 2013/0322702 | A1* | 12/2013 | Piemonte | ............. G06T 15/005 382/113 |
| 2015/0371440 | A1* | 12/2015 | Pirchheim | ................. G06T 7/73 345/419 |
| 2017/0337824 | A1* | 11/2017 | Chen | .................... G05D 1/0094 |
| 2020/0027266 | A1* | 1/2020 | Chen | ................... G06K 9/00201 |

FOREIGN PATENT DOCUMENTS

KR    20170055577 A   *  5/2017

* cited by examiner

*Primary Examiner* — Chong Wu
(74) *Attorney, Agent, or Firm* — Fish & Richardson P.C.

(57) ABSTRACT

The present invention relates to an image output device provided in a vehicle. The image output device includes: an image output unit; and a processor obtaining a plurality of coordinate values constituting a certain building from a map, generating a graphic object, which overlaps at least a portion of the building, using the coordinate values when the building is searched from within a predetermined range with respect to the vehicle, and outputting the generated graphic object through the image output unit.

20 Claims, 17 Drawing Sheets

IMAGE OUTPUT DEVICE

CROSS-REFERENCE TO RELATED APPLICATIONS

Pursuant to 35 U.S.C. § 119(a), this application claims the benefit of earlier filing date and right of priority to PCT Application No. PCT/KR2018/008249, filed on Jul. 20, 2018, the contents of which are incorporated by reference herein in their entirety.

FIELD

The present disclosure relates to an image output device, and more particularly, to an image output device mounted on a vehicle and providing various kinds of visual information to an occupant.

BACKGROUND

A vehicle refers to a means of transportation for moving people or fright using kinetic energy. Typical examples of vehicles include automobiles and motorcycles.

For the safety and convenience of a user who uses a vehicle, various sensors and devices are provided in the vehicle, and the functions of the vehicle are diversified.

Functions of the vehicle may be divided into a convenience function for promoting driver's convenience and a safety function for ensuring the driver and/or a pedestrian.

First, the convenience function has a development motivation related to driver's convenience such as providing an (information+entertainment) function to a vehicle, supporting a partial autonomous driving function or securing a visual field of a driver such as a visual field at night or at a blind spot, and the like. For example, the convenience function includes active cruise control (ACC), a smart parking assist system (SPAS), night vision (NV), head up display (HUD), around view monitor (AVM), and an adaptive headlight system (AHS), and the like.

The safety function is a technique of ensuring safety of a driver and/or a pedestrian. The safety function includes a lane departure warning system (LDWS), a lane keeping assist system (LKAS) (autonomous emergency braking (AEB), and the like.

In order to further improve the convenience function and the safety function described above, a communication technology specialized for a vehicle has been developed. For example, a vehicle-to-infrastructure (V2I) that enables communication between a vehicle and an infrastructure, a vehicle to-vehicle (V2V) that enables communication between a vehicle and a vehicle, and a vehicle-to-everything (V2X).

A vehicle is provided with an image output device for visually providing various types of information to an occupant. The image output device includes a head-up display (HUD) for outputting information to a windshield of the vehicle or a separately provided transparent screen and/or various displays for outputting information through a panel.

The image output device provides route guidance information to a destination and information on a point of interest (POI), and is developed toward effectively providing various types of information. Particularly, research into an image output device that directly and effectively provides necessary information to a driver who is to concentrate on driving, within a range not disturbing driving has continued.

SUMMARY

The present invention is to solve the aforementioned problems and other problems.

An aspect of the present invention provides an image output device capable of effectively guiding a point of interest (POI) of an occupant to the occupant.

Another aspect of the present invention provides an image output device capable of precisely matching an object of a real world and an object of a virtual world, while providing a point of interest (POI) of an occupant as an augmented reality.

The present invention relates to an image output device provided in a vehicle.

The image output device includes: an image output unit; and a processor obtaining a plurality of coordinate values constituting a certain building from a map, generating a graphic object, which overlaps at least a portion of the building, using the coordinate values when the building is searched from within a predetermined range with respect to the vehicle, and outputting the generated graphic object through the image output unit.

According to an embodiment, the image output device may further include: a communication unit receiving an image from a camera provided in the vehicle, wherein the processor may control the image output unit such that the graphic object overlaps the image.

According to an embodiment, the processor may generate the graphic object by converting the coordinate values into a coordinate system defined by the image.

According to an embodiment, the coordinate values may be expressed by a 3D coordinate system defined by three axes perpendicular to each other, and the coordinate system defined by the image may be a 2D coordinate system defined by two axes perpendicular to each other.

According to an embodiment, the two axes of the coordinate system may be defined differently according to at least one of a position of the vehicle and a driving direction of the vehicle.

According to an embodiment, the processor may define the coordinate system in consideration of a position where the camera is installed in the vehicle.

According to an embodiment, the processor may extract vertices of the building from the map and obtain the coordinate values corresponding to the vertices.

According to an embodiment, the processor may generate a 3D outline information regarding the building using the coordinate values, and obtain the graphic object by applying the 3D position information to a position of the vehicle.

According to an embodiment, the image output device may further include: a memory storing the 3D outline information, wherein the 3D outline information may include a central coordinate value of the building and coordinate values of a plurality of vertices of the building.

According to an embodiment, the processor may search for a partial region including the building from the image using the 3D outline information and match the graphic object to the searched partial region.

According to an embodiment, when the partial region is searched from the image, the processor may control the image output unit to output the graphic object, and when the partial region is not searched from the image, the processor may control the image output unit not to output the graphic object.

According to an embodiment, the graphic object may be divided into a first portion in which the outline of the building is identified and a second portion in which the outline of the building is not identified in the image, and the processor may output the first portion and the second portion in different manners so that the first portion and the second portion may be distinguished from each other.

According to an embodiment, the graphic object may be output in different manners according to whether at least a portion of the building is included in the image.

According to an embodiment, the 3D outline information may be determined by the image received from the camera.

According to an embodiment, the graphic object may include a first quadrangle representing a first side of the building and a second quadrangle representing a second side of the building connected to the first side.

According to an embodiment, the processor may adjust at least one of a shape and a size of the graphic object in consideration of a position of the vehicle and a position of the building.

According to an embodiment, the processor may select the building among a plurality of buildings according to a preset condition.

According to an embodiment, the image output unit may output the graphic object to a windshield of the vehicle, and the processor may generate the graphic object by converting the coordinate values to a coordinate system defined by an eye position of an occupant who is riding on the vehicle.

According to an embodiment, the image output device may further include: a memory storing 3D outline information regarding a plurality of buildings, wherein the map may be received from a server, and when a new building not stored in the memory is included in the map received from the server, the processor may generate 3D outline information regarding the new building and store the generated 3D outline information in the memory.

According to an embodiment, the graphic object may be a boundary line surrounding an outline of the building.

The effect of the image output device according to the present invention will be described as follows.

The image output device according to the present invention may reconstruct a specific building in three dimensions through 3D modeling using information provided by a 2D map and generate 3D outline information based on pixel coordinates. Thereafter, the image output device may locate a target building by a camera and subsequently guide an outline shape of the building through a graphic object. The image output device realizes an augmented reality by overlapping a graphic object of a virtual world on a building of a real world.

Since the 2D map is used, although the building is covered by trees or other vehicles, it is possible to guide a perfect outline of the building and guide the perfect outline of the building even in bad weather or at night. This allows an occupant to intuitively recognize which building is the target building and to ascertain an exact appearance of the target building.

Since the 3D outline information is used, time and cost required for realizing an augmented reality may be saved and efficiency of the memory is increased.

BRIEF DESCRIPTION OF THE DRAWINGS

The embodiments will be described in detail with reference to the following drawings in which like reference numerals refer to like elements wherein.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
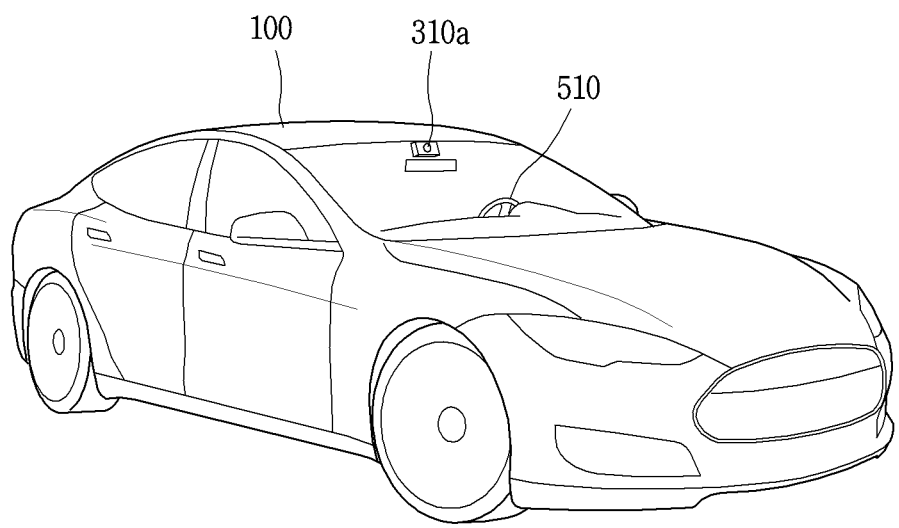
FIG. 1 is a view illustrating an appearance of a vehicle according to an embodiment of the present disclosure.
Figure 1:
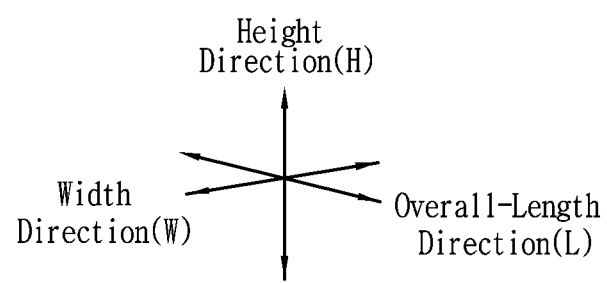

FIG. 1 is a view illustrating appearance of a vehicle in accordance with an embodiment of the present invention.

Figure 2:
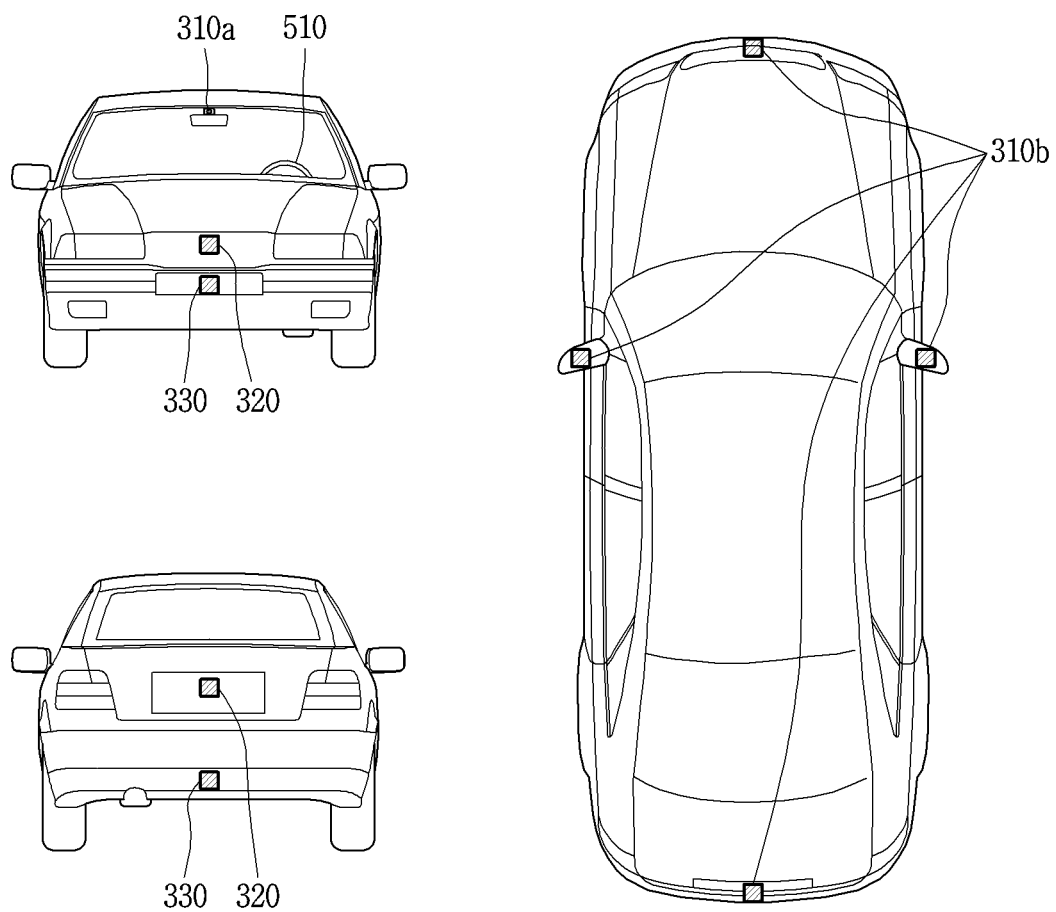
FIG. 2 is a view illustrating a vehicle according to an embodiment of the present disclosure viewed at various angles.

FIG. 2 is a view illustrating appearance of a vehicle at various angles in accordance with an embodiment of the present invention.

Figure 3:
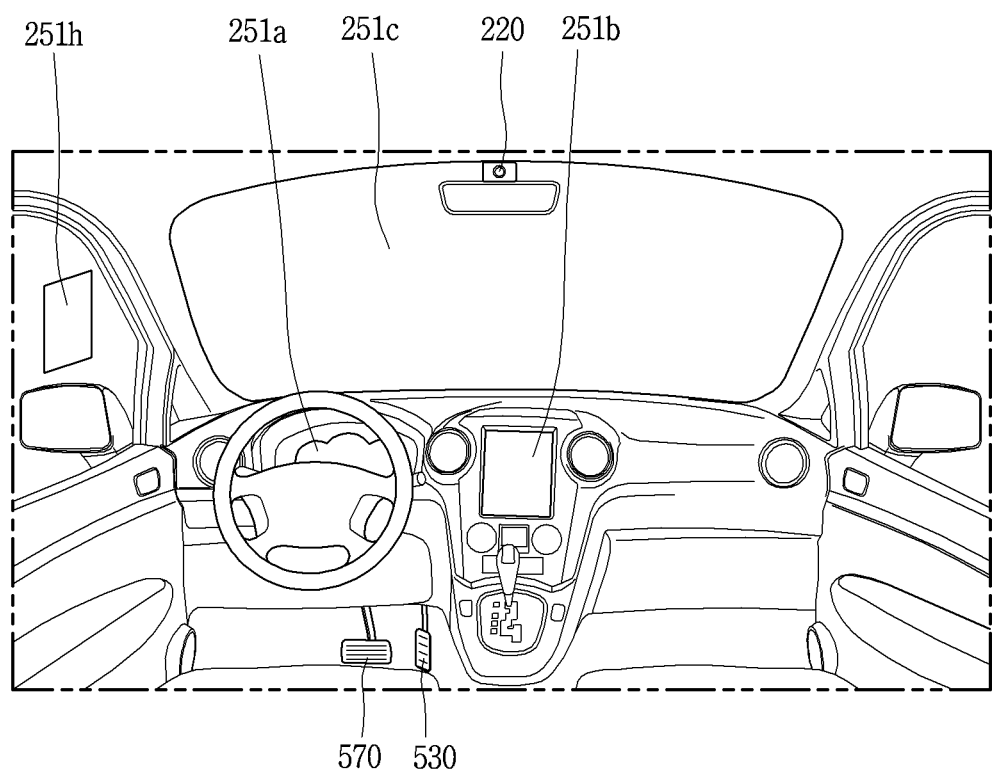
FIGS. 3 and 4 are views illustrating the inside of a vehicle according to an embodiment of the present disclosure.
Figure 4:
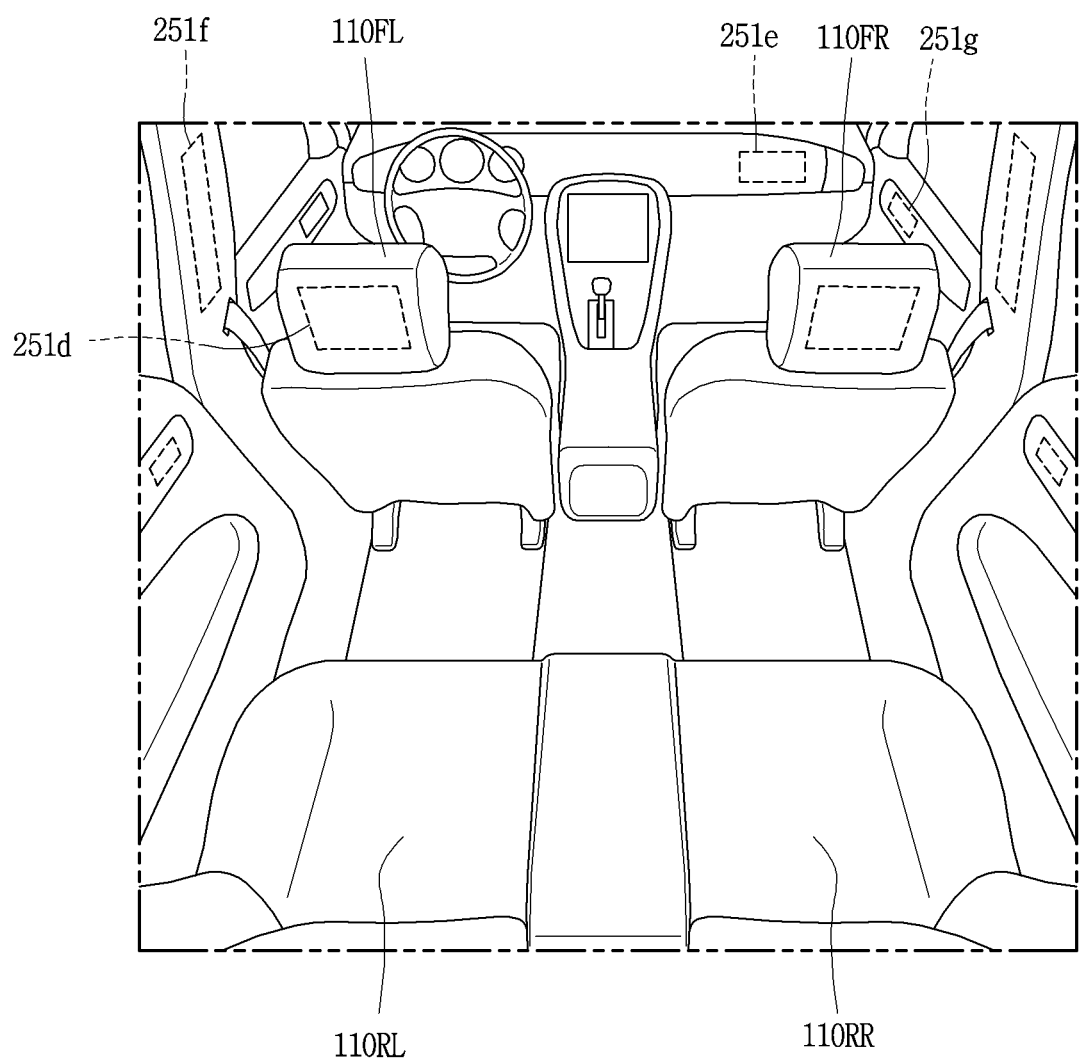

FIGS. 3 and 4 are views illustrating an inside of a vehicle in accordance with an embodiment of the present invention.

Figure 5:
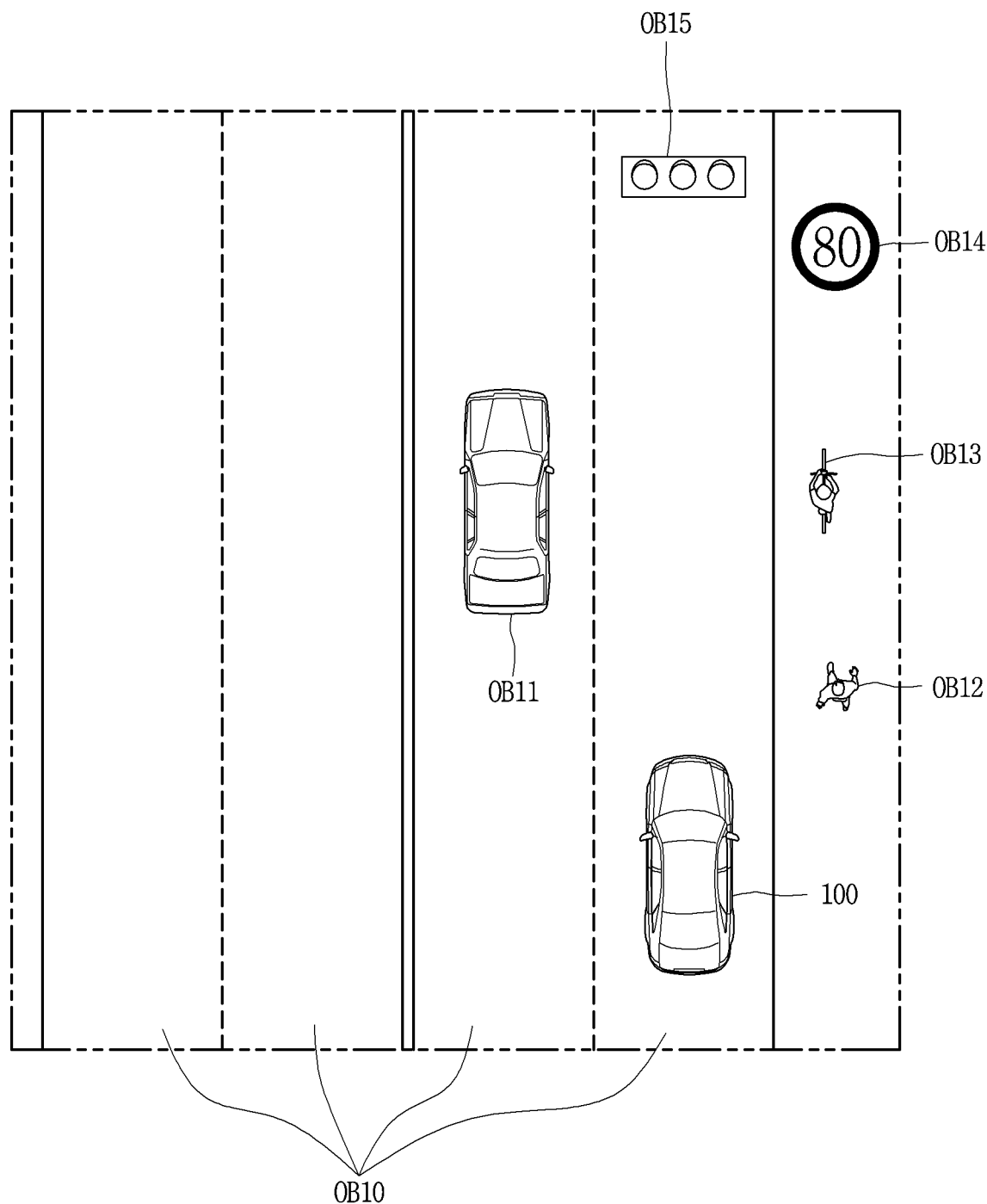
FIGS. 5 and 6 are views referred to in explaining an object according to an embodiment of the present disclosure.
Figure 6:
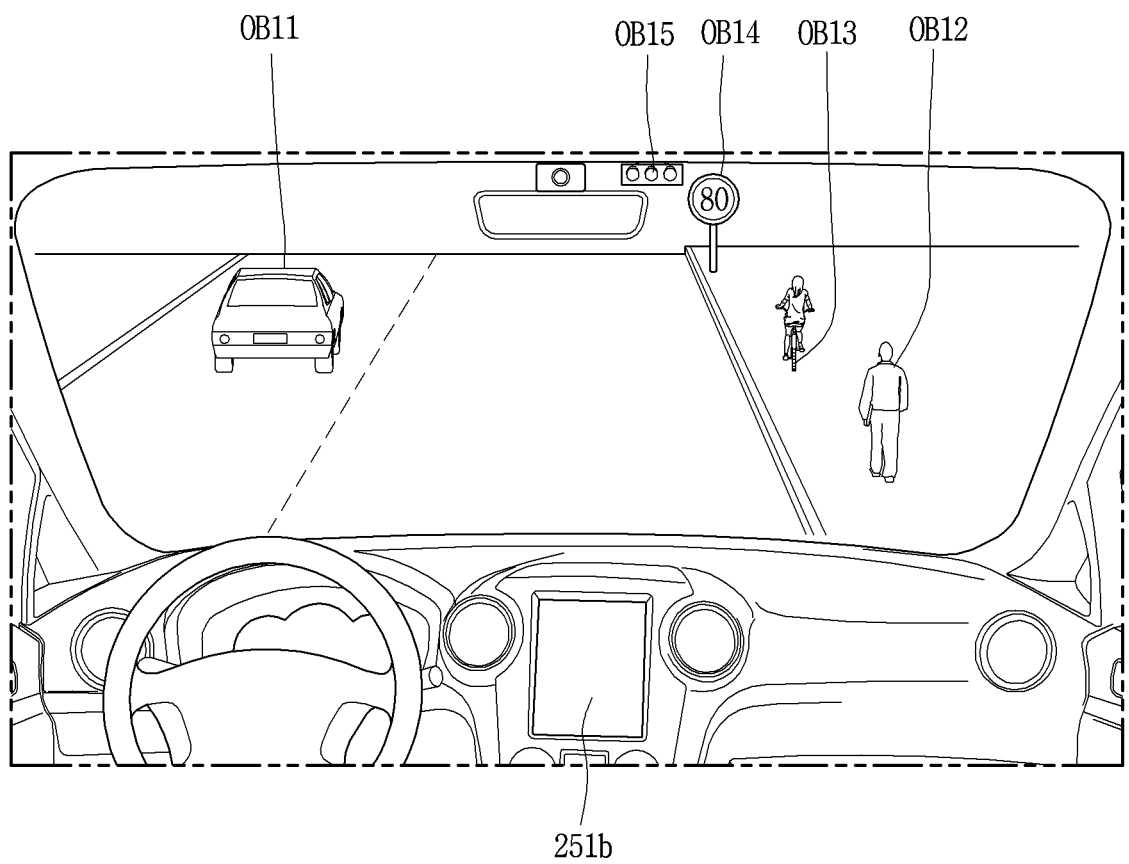

FIGS. 5 and 6 are reference views illustrating objects in accordance with an embodiment of the present invention.

Figure 7:
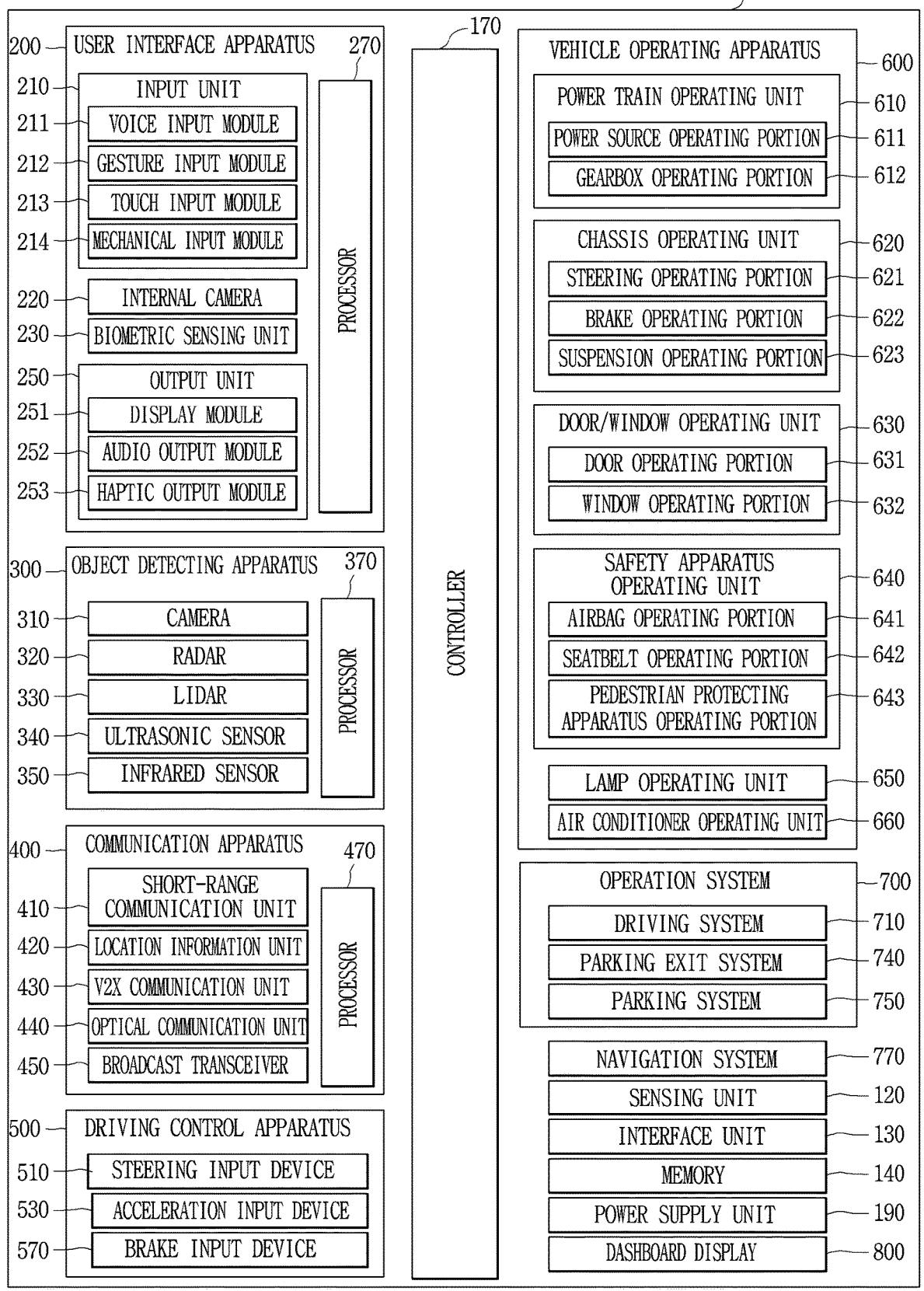
FIG. 7 is a block view referred to in explaining a vehicle according to an embodiment of the present disclosure.

FIG. 7 is a block diagram illustrating a vehicle in accordance with an embodiment of the present invention Referring to FIGS. 1 to 7, the vehicle 100 may include wheels turning by a driving force, and a steering apparatus 510 for adjusting a driving (ongoing, moving) direction of the vehicle 100.

The vehicle 100 may be an autonomous vehicle.

Here, the autonomous driving is defined to control at least one of acceleration, deceleration, and a driving direction on the basis of a preset algorithm. In other words, although a user input is not input to a driving control apparatus, the driving control apparatus is automatically operated.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon.

The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle.

The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication apparatus 400 may be called a "wireless communication unit".

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox.

The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a yaw sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an image output device 800 provided in the vehicle 100 will be described in detail.

The image output device 800 is provided in the vehicle 100 and may be an independent device which is detachable attached to the vehicle 100 or may be integrally installed in the vehicle 100 to form a part of the vehicle 100.

An operation and a control method of the image output device 800 described in this disclosure may be performed by the controller 170 of the vehicle 100. That is, the operation and/or the control method performed by a processor 870 of the image output device 800 may be performed by the controller 170 of the vehicle 800.

Figure 8:
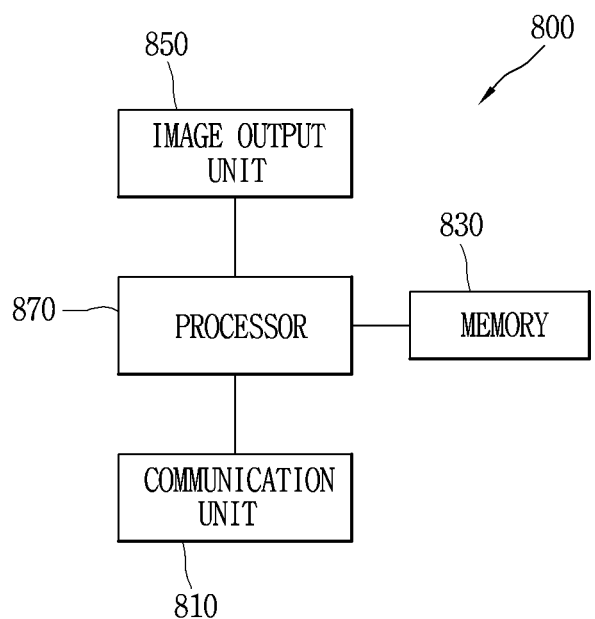
FIG. 8 is a conceptual diagram illustrating an image output device according to an embodiment of the present invention.

Referring to FIG. 8, the image output device 800 includes a communication unit 810, a memory 830, an image output unit 850, and a processor 870.

The communication unit 810 is configured to perform communication with various components described in FIG. 7. For example, the communication unit 810 may receive various types of information provided through a controller area network (CAN). In another example, the communication unit 810 may perform communication with all devices capable of performing communication, such as a vehicle, a mobile terminal and a server, and another vehicle. This may be named V2X (vehicle to everything) communication. V2X communication may be defined as a technology for exchanging or sharing information regarding a traffic situation, while communicating with a road infrastructure and another vehicle during driving.

The communication unit 810 is configured to perform communication with one or more devices provided in the vehicle 100.

Furthermore, the communication unit 810 may receive information related to driving of the vehicle from most devices provided in the vehicle 100. Information transmitted from the vehicle 100 to the display device 800 will be referred to as 'vehicle driving information'.

The vehicle driving information includes vehicle information and surrounding information of the vehicle. With reference to a frame of the vehicle 100, information related to the inside of the vehicle may be defined as vehicle information and information related to the outside of the vehicle may be defined as surrounding information.

Vehicle information refers to information regarding a vehicle itself. For example, vehicle information may include a driving speed of a vehicle, a driving direction, acceleration, an angular velocity, a position (GPS), a weight, the number of occupants in a vehicle, braking power of a vehicle, maximum braking power of a vehicle, pressure of each wheel, centrifugal force applied to a vehicle, a running mode of a vehicle (whether the vehicle is in an autonomous driving mode or a manual driving mode), a parking mode of a vehicle (autonomous parking mode, autonomic parking mode, manual parking mode), whether a user is present within a vehicle, information related to a user, and the like.

The surrounding information refers to information regarding another object positioned within a predetermined range around a vehicle and information related to the outside of a vehicle. For example, the surrounding information may be a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, brightness around the vehicle, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information may include ambient brightness, temperature, a location of the sun, information of an object positioned nearby ((person, another vehicle, a sign, etc.), a type of a road surface on which the vehicle is driving, a geographic feature, line information, or lane information in which the vehicle is driving, and information required for autonomous driving/autonomous parking/automatic parking/manual parking mode.

Also, the surrounding information may further include a distance between an object present in the vicinity of the vehicle 100 and the vehicle 100, a possibility of collision, a type of the object, a parking space in which the vehicle may park, an object (e.g., a parking line, a string, another vehicle, a wall, etc.) for identifying the parking space, and the like.

The vehicle driving information is not limited to the examples described above and may include every information generated from components provided in the vehicle 100.

The memory 830 stores 3D outline information to be described below. The 3D outline information for each of a plurality of buildings is managed as a database and may be added/edited/deleted by the processor 870.

Here, the 3D outline information is defined as information for visually expressing an outer edge of a building using a graphic object, and may include a center coordinate value of the building, and a plurality of vertex coordinate values.

The image output unit 850 outputs various visual information under the control of the processor 870. The image output unit 850 may output visual information to a windshield of a vehicle or a screen provided separately, or may output visual information through a panel. The image output unit 850 may correspond to the display unit 251 described above with reference to FIGS. 1 to 7.

The processor 870 performs various operations to be described later with reference to FIGS. 9 to 16 and controls the communication unit 810, the memory 830, and the image output unit 850.

Meanwhile, the processor 870 may be configured to control one or more devices provided in the vehicle 100 using the communication unit 810.

In detail, the processor 870 may determine whether at least one of a plurality of preset conditions is satisfied on the basis of vehicle driving information received through the communication unit 810. According to the satisfied condition, the processor 870 may control the one or more displays in different manners.

Regarding a preset condition, the processor 870 may sense occurrence of an event in an electronic/electronic component and/or application provided in the vehicle 100, and determine whether the sensed event meets the preset condition. Here, the processor 870 may sense that event has occurred from information received through the communication unit 810.

The application, a concept including a widget, a home launcher, and the like, refers to any type of program which can be driven in the vehicle 100. Thus, the application may be a program performing a function of a Web browser, video play, message transmission/reception, schedule management, and application updating.

In addition, the application may include at least one of a forward collision warning (FCW), blind spot detection (BSD), land departure warning (LDW), pedestrian detection (PD), curve speed warning (CSW), and turn-by-turn navigation (TBT).

For example, an even may occur in the case of an absent call, in case where there is an application to be updated, in case where a message arrives, start-on, start-off, autonomous driving ON/OFF, display activation key pressing (LCD awake key), alarm, incoming call, missed notification, and the like.

In another example, an event occurs when warning set in an advanced driver assistance system (ADAS) occurs and when a function set in the ADAS is performed. For example, it is considered that an event occurs when forward collision warning (FCW) occurs, blind spot detection (BSD) occurs, when lane departure warning (LDW) occurs, when lane keeping assist warning occurs, and when an autonomous emergency braking is performed.

In another example, it is considered that an event occurs in case where a forward gear is switched to a reverse gear, in case where acceleration greater than a predetermined value occurs, in case where deceleration greater than a predetermined value occurs, in case where a power unit is switched from an internal combustion to a motor, or in case where a power unit is switched from the motor to the internal combustion.

In addition, it is considered that an event occurs when various ECUs provided in the vehicle 100 performs a specific function.

In case where a generated event satisfies a preset condition, the processor 870 controls the communication unit 810 such that information corresponding to the satisfied condition is displayed on the one or more displays.

The processor 870 may transmit an autonomous driving message to at least one of a plurality of devices provided in the vehicle 100 so that autonomous driving of the vehicle 100 may be performed. For example, an autonomous driving message may be transmitted to a brake so that deceleration may be performed, or an autonomous driving message may be transmitted to a steering device so that a driving direction may be changed.

The image output device according to the present invention may reconstruct a specific building in three dimensions through 3D modeling using information provided by a 2D map, and generate 3D outline information based on pixel coordinates. Thereafter, the image output device may locate a target building by a camera and guide an outline shape of the building using the 3D outline information through a graphic object. By overlapping a graphic object of a virtual world on a building of the real world, thus realizing augmented reality.

Since the 2D map is used, although the building is covered by trees or other vehicles, the perfect outline of the building may be guided and the perfect outline of the building may be guided even in bad weather and at night. Thus, the occupant may recognize which the target building is by intuition and check an accurate appearance of the target building.

Since the 3D outline information is used, time and cost required for realizing augmented reality may be saved and efficiency of the memory may be increased.

Hereinafter, an operation of the image output device 800 will be described in more detail with reference to the accompanying drawings.

Figure 9:
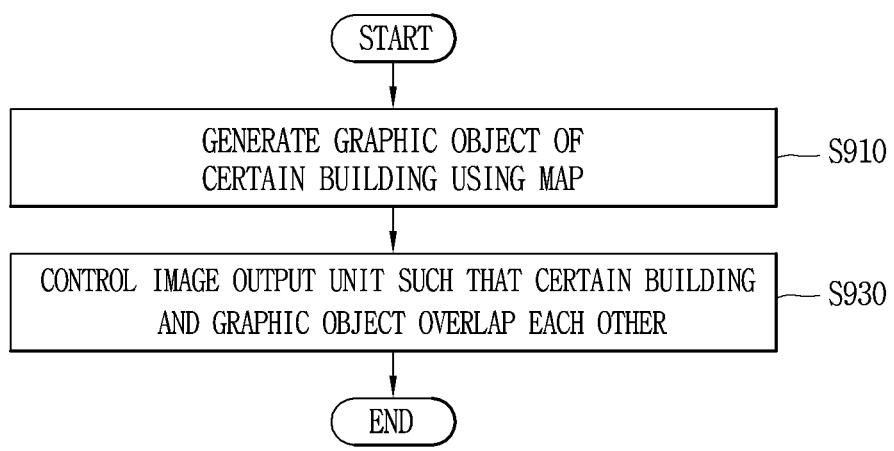
FIG. 9 is a flowchart for explaining a control method of an image output device.

FIG. 9 is a flowchart for explaining a control method of an image output device.

First, the processor 870 generates a graphic object of a building using a map (S910).

The processor 870 may select one or more of a plurality of buildings according to predetermined conditions. The processor 870 may select a building set as a destination or set as a point of interest (POI). Alternatively, the processor 870 may select a building according to a user input. For example, in case where a gas station is set as a POI, a building corresponding to a gas station may be selected, and the selected building may be one or a plurality of buildings.

When the selected building is located within a predetermined range based on the vehicle 100 (or when it is searched within the predetermined range), the processor 870 may generate a graphic object of the selected building using a map.

The predetermined range is determined by an image received from a camera included in the vehicle 100, and may vary according to predetermined conditions. Since the target building needs to be searched from the image, the predetermined range may vary depending on a traffic volume, density of buildings, a size of the target building, and the like. For example, if the size of the target building is included in a first range, a first predetermined range may be set. However, if the size of the target building is included in a second range smaller than the first range, a second predetermined range smaller than the first predetermined range may be set.

The map may be stored in the memory 830 or transmitted in real time via the communication unit 810 from the server. The map may provide 2D and/or 3D map information.

The graphic object may be configured to distinguish the target building from other buildings, and a shape of the graphic object may vary according to the shape of the target building. For example, the graphic object may be a boundary line surrounding an outline of the target building.

The processor 870 generates the graphic object using the map, and a specific method thereof will be described later with reference to FIG. 10.

Next, the processor 870 controls the image output unit such that the building and the graphic object overlap each other (S930).

When the image output unit 830 is configured as a HUD type that outputs to a windshield or a screen, a position to which the graphic object is output may vary depending on an eye position of an occupant which is riding in the vehicle. To this end, the processor 870 may convert coordinate values of the building into a coordinate system defined by the eye position of the occupant riding in the vehicle, thereby generating a graphic object. The occupant may be provided with a graphic object that exactly overlaps the building of the real world.

When the image output unit 830 is formed as a panel, the image output unit 830 may display an image captured by the camera provided in the vehicle 100 and display the graphic object on the image such that the graphic object overlaps the building included in the image. The image may be received through the communication unit 810.

A specific method of providing a graphic object to augmented reality will be described later with reference to FIG. 13.

Figure 10:
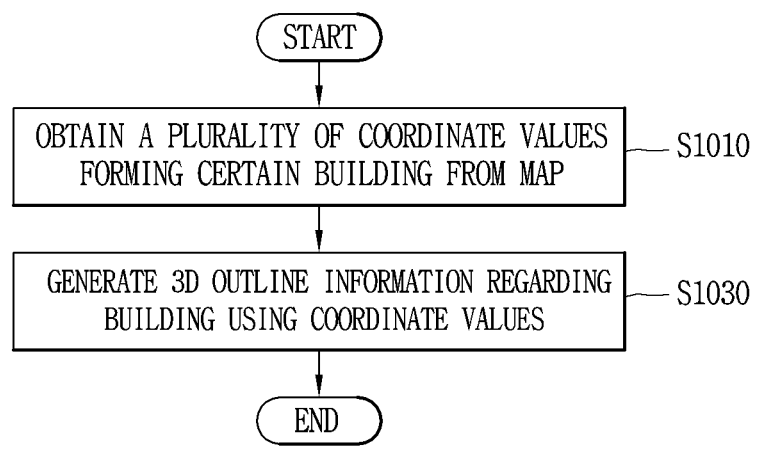
FIG. 10 is a flowchart for describing step (S910) of generating a graphic object of FIG. 9 in more detail.
Figure 11:
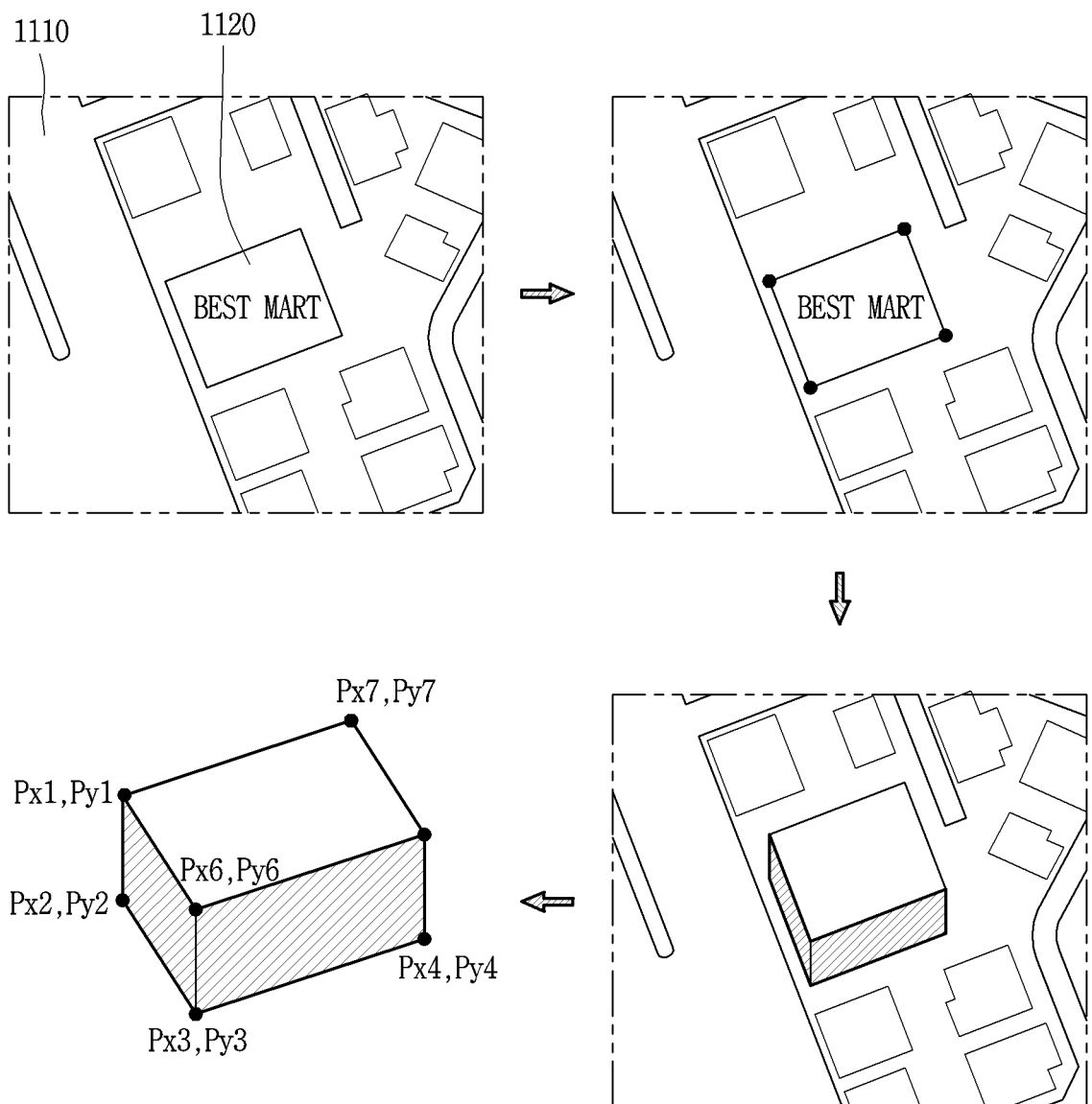
FIG. 11 is a conceptual diagram for explaining each step of FIG. 10.

FIG. 10 is a flowchart illustrating step (S910) of generating a graphic object in FIG. 9, and FIG. 11 is a conceptual diagram for explaining each step in FIG. 10.

The processor 870 obtains a plurality of coordinate values constituting a certain building from a map (S1010).

Specifically, the processor 870 searches for a building 1120 on a map 1110 and extracts vertices of the building 1120 from a footprint occupied by the building 1120. The processor 870 acquires coordinate values corresponding to the vertices.

Since the map provides GPS information and height information regarding the vertices, coordinate values of each vertex include three variables (latitude, longitude, altitude).

The number of extracted vertices may vary depending on a shape of the building. For example, as illustrated in FIG. 11, when the building 1120 has a rectangular shape, four vertices may be extracted. Alternatively, if the building is a pentagonal shape, five vertices may be extracted.

Next, the 3D outline information about the building is generated using the coordinate values (S1030).

The processor 870 may generate 3D outline information regarding the building 1120 using the information provided by the map. The processor 870 may use a 3D modeling technique to generate 3D outline information.

The 3D outline information is defined as information capable of restoring (or expressing) the building 1120 in three dimensions. For example, the 3D outline information may include an ID identifying the building 1120, a center coordinate value of the building 1120, and a plurality of vertex coordinate values.

The processor 870 may generate a pixel-based 2D image in the form of a picture for a building reconstructed in three dimensions. More specifically, a 3D reconstructed building is converted into a 2D image that may be displayed when the occupant looks at the position of the vehicle (or when the camera captures a 2D image at the position of the vehicle), and each vertex of the building may be extracted as a coordinate value in the 2D image. Here, the coordinate values may be extracted using the pixels of the 2D image.

The generated 3D outline information may be stored in the memory 830 or used one time and deleted. In order to efficiently manage the memory, the 3D outline information of the target building may be stored in the memory 830 only when the target building is selected a predetermined number of times or greater, and may not be stored in the memory 830 in otherwise cases.

Figure 12A:
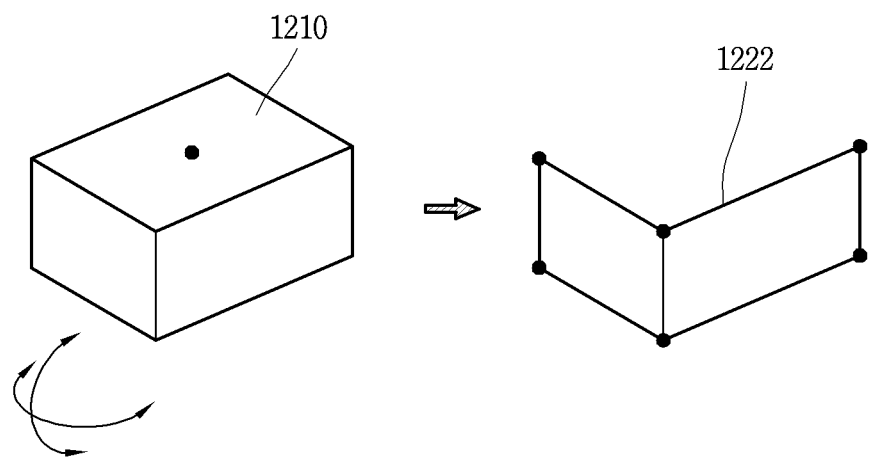
FIGS. 12A and 12B are conceptual diagram for explaining a method of generating a graphic object using 3D outline information.
Figure 12B:
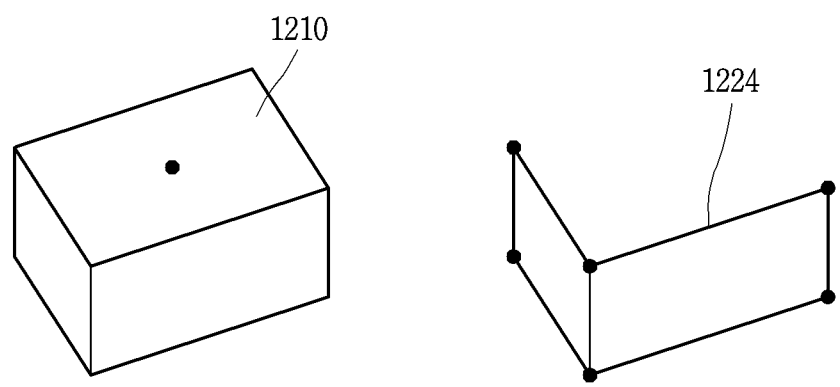

FIGS. 12A and 12B are conceptual diagrams illustrating a method of generating a graphic object using 3D outline information.

The processor 870 may reconstruct a target building into a 3D shape using 3D outline information. Since the shape of the building viewed by the occupant (or imaged by the camera) changes according to a position of the vehicle, the processor 870 generates a graphic object in consideration of the position of the vehicle.

As illustrated in FIGS. 12A and 12B, in spite of the same building, the shapes of graphic objects overlapping on the building may vary depending on a location of the vehicle. For example, if the vehicle is at a first position, a first graphic object 1222 for the building 1210 may be generated, and if the vehicle is at a second position, a graphic object 1224 for the building 1210 may be generated.

The graphic object may be displayed on an image captured by the camera provided in the vehicle 100. In this case, the processor 870 may generate the graphic object in consideration of a position where the camera is installed in the vehicle. For example, when the camera is oriented to the front of the vehicle 100 and when the camera is oriented to the side of the vehicle 100, although the vehicle is at the same position, shapes of graphic objects may differ. This is because, even the same building, a shape of the building which is visually checked may be varied according to directions in which the building is viewed.

The processor 870 may adjust at least one of the shape and the size of the graphic object in consideration of the position of the vehicle and the position of the building. This is to ensure that the building and graphic objects included in the image completely overlap.

The graphic object may include a first quadrangle representing a first side of the target building and a second quadrangle representing a second side of the building connected to the first side. The occupant may recognize the target building in three dimensions by the first quadrangle and the second quadrangle.

The graphic object may be a boundary line guiding an outline of the building included in the image.

Figure 13:
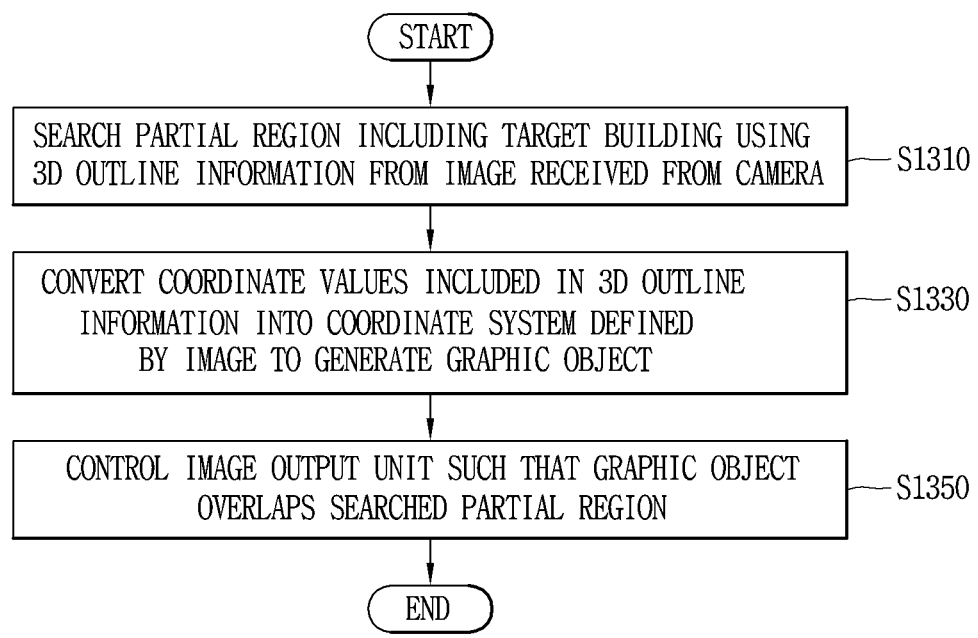
FIG. 13 is a flowchart for explaining step (S930) of controlling an image output unit of FIG. 9.

FIG. 13 is a flowchart illustrating step (S930) of controlling the image output unit of FIG. 9 in more detail.

The processor 870 may generate 3D outline information for the target building using coordinate values extracted from a map and apply the 3D outline information to the position of the vehicle to obtain the graphic object.

Specifically, the processor 870 searches a partial area including the target building using the 3D outline information from the image received from the camera (S1310).

For example, the processor 870 may extract a boundary line of the building from the image and search for a partial region including the target building on the basis of the 3D outline information.

Next, the processor 870 converts coordinate values included in the 3D outline information into a coordinate system defined by the image to generate a graphic object (S1330).

The 3D outline information includes coordinate values, and the coordinate values are represented by a 3D coordinate system defined by three mutually orthogonal axes. Alternatively, the coordinate system defined by the image corresponds to a 2D coordinate system defined by two mutually orthogonal axes.

The processor 870 may convert the coordinate values included in the 3D outline information into a coordinate system defined by the image to generate a graphic object which exactly overlaps the target building.

The two axes of the coordinate system defined by the image are differently defined according to at least one of the position of the vehicle and the driving direction of the vehicle. Accordingly, a graphic object of a virtual world that exactly overlaps a building in the real world may be generated. The coordinate system is defined differently according to movement of the vehicle, and thus, the graphic object is also generated in real time. Because the coordinate system transformation is used, a computation speed is fast and real-time characteristics may be guaranteed.

Next, the processor controls the image output unit so that the graphic object overlaps the searched partial region (S1350).

The processor searches for a partial region including the target building from the image using the 3D outline information and matches the graphic object to the searched partial region.

The processor calculates a distance between the vehicle 100 and the target building, adjusts the size of the building in a pixel level, and overlaps the graphic object on a real-time image.

Since the graphic object is generated using the coordinate system conversion, a perfect augmented reality may be implemented, regardless of performance of the image captured by the camera. Although the position of the vehicle is inaccurate due to a GPS error, since a partial region including the target building is searched from the image using the 3D outline information and the graphic object is overlapped on the searched partial region, accuracy is enhanced.

Figure 14A:
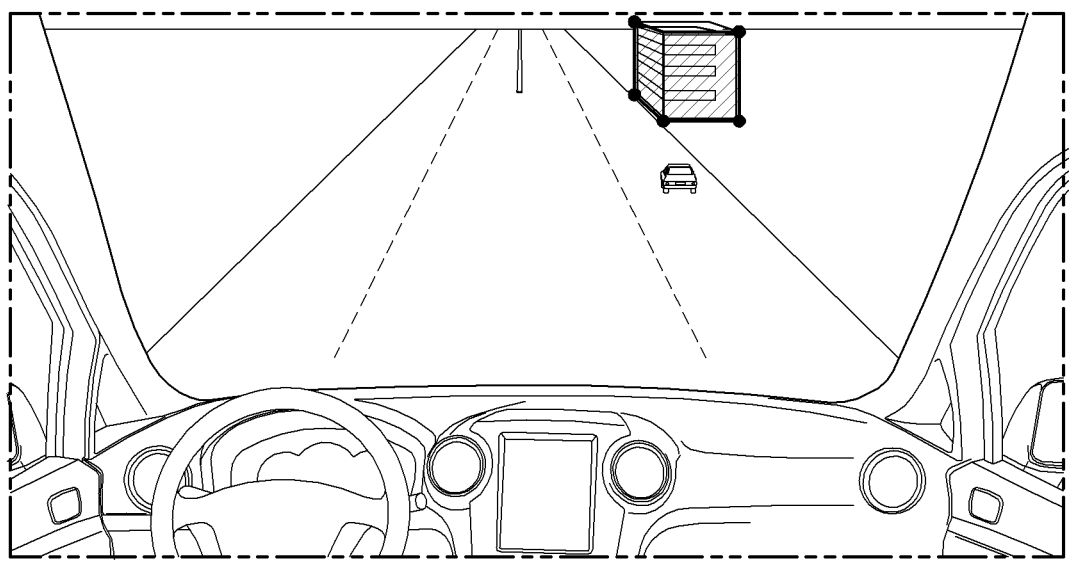
FIGS. 14A and 14B are conceptual diagrams for explaining a method of outputting graphic objects in a HUD manner.
Figure 14B:
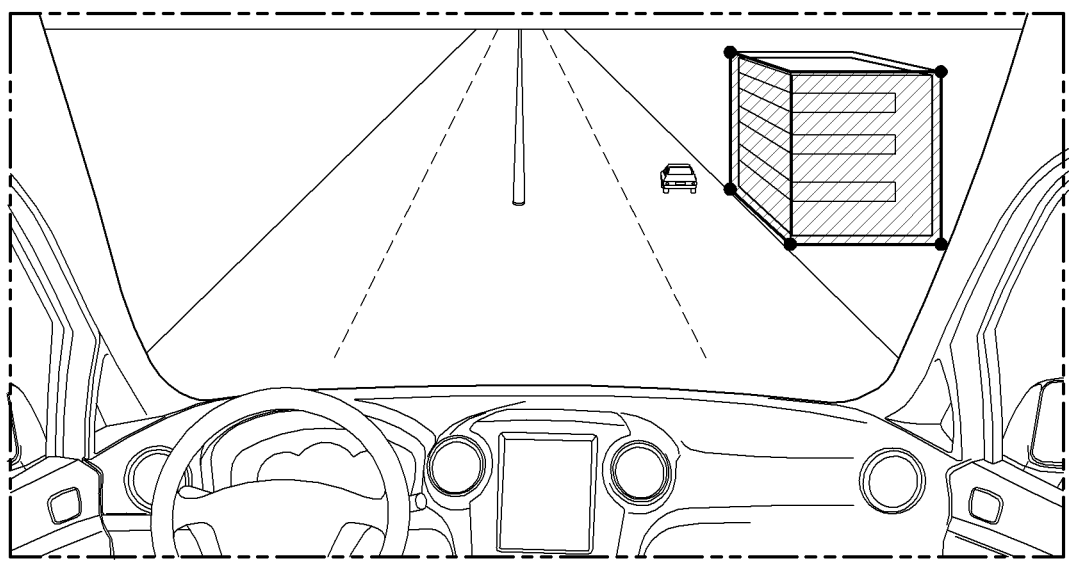

FIGS. 14A and 14B are conceptual diagrams for explaining a method of outputting a graphic object according to the HUD method.

The image output unit 850 may output the graphic object on the windshield or the screen of the vehicle 100.

In this case, the processor 870 may generate the graphic object by converting the 3D outline information of the target building into a coordinate system defined by an eye position of the occupant who is riding on the vehicle 100. This is because, an area in which the building of the real world and the graphic object overlap is varied according to eye positions.

According to the eye position, the size and shape of the graphic object are different, and the position at which the graphic object is displayed is also changed.

Figure 15A:
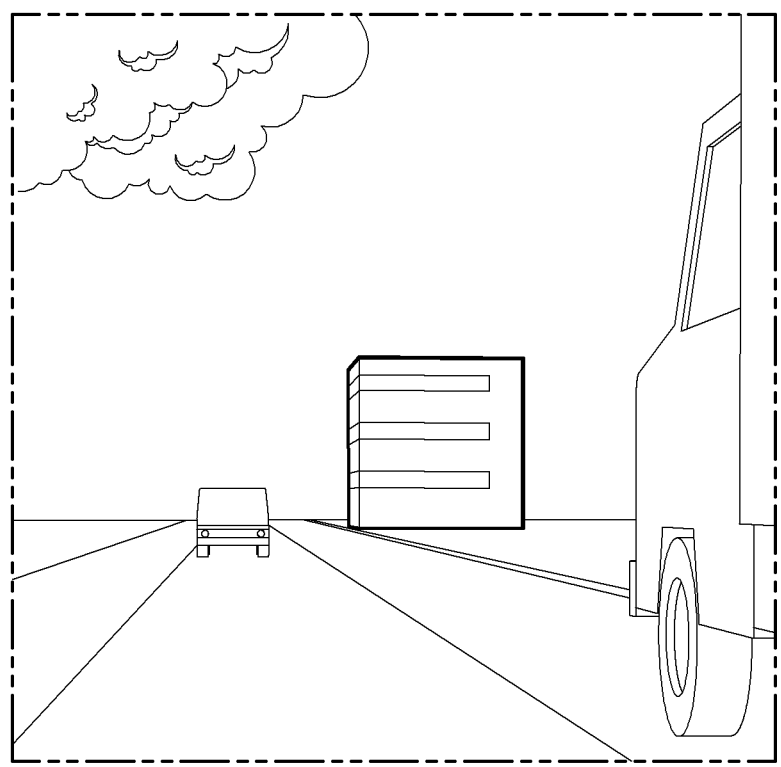
FIGS. 15A, 15B, and 15C are diagrams for explaining a method of outputting graphic objects in different ways according to various situations.
Figure 15B:
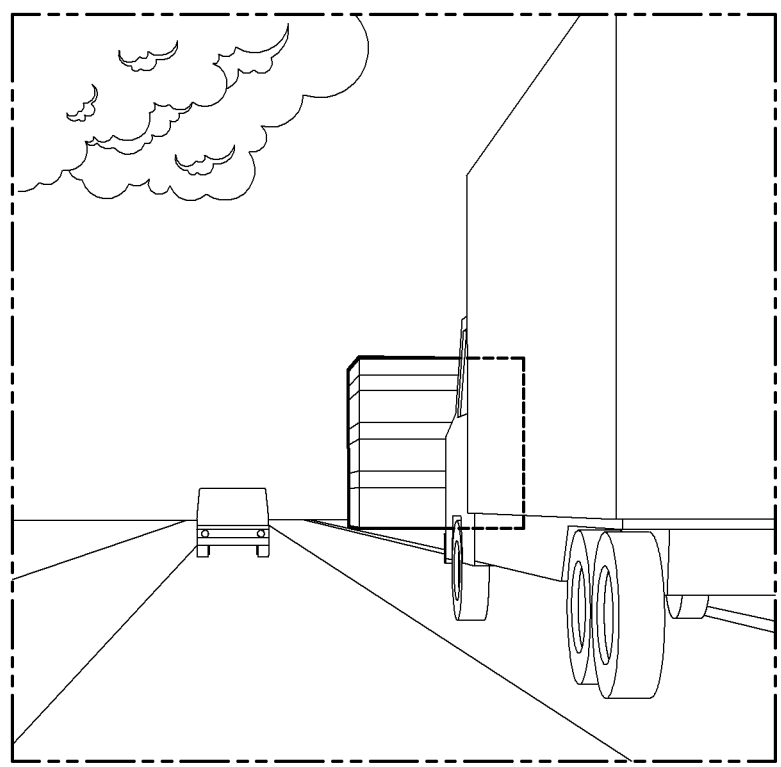
Figure 15C:
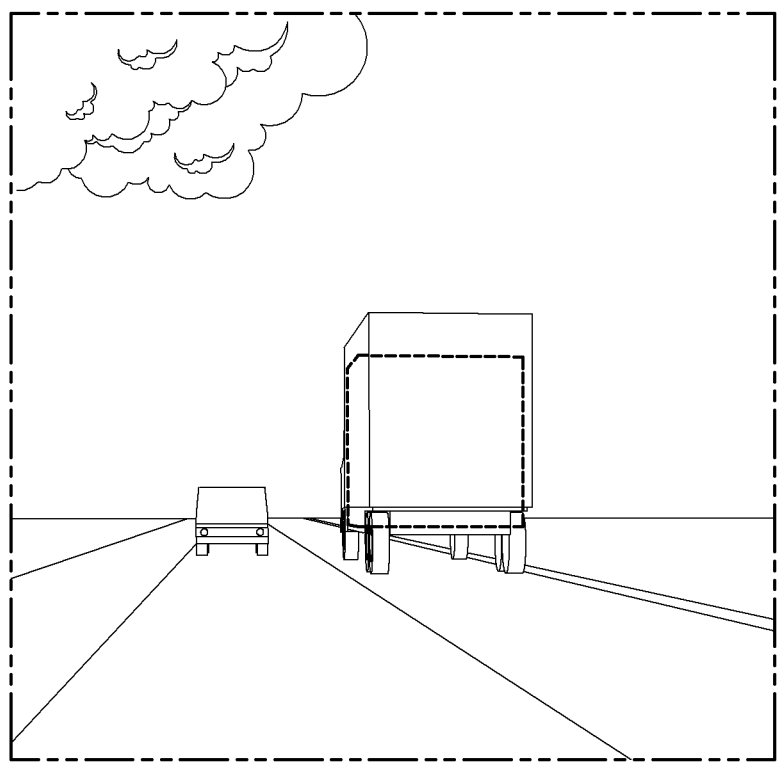

FIGS. 15A, 15B, and 15C are views for explaining a method of outputting graphic objects in different manners according to various situations.

The processor 870 may output a graphic object in different manners according to various situations. More specifically, the graphic object may be different images depending on whether the target building is included in the image. Here, the different images refer to images having different shapes, lengths, colors, and the like, for example.

When a partial region including the target building is included is searched from the image, the processor 870 may control the image output unit 850 to output a graphic object, and when the partial region is not searched from the image, the processor 870 may control the image output unit 850 not to output the graphic object. This is because, if the graphic object tis output although a building is not checked in the image, the occupant may misunderstand that the image output device is broken.

The processor 870 may divide the graphic object into a first portion in which the outline of the target building is identified in the image and a second portion in which the outline of the target building is not identified. The second portion in which the outline of the building is not identified is defined as a portion covered by another object.

The processor 870 may output the first portion and the second portion in different manners so that the first portion and the second portion are distinguished from each other. For example, as illustrated in FIG. 15A, when the graphic object includes only the first portion, the graphic object may be represented by the solid line. In another example, as illustrated in FIG. 15B, if the graphic object includes the first portion and the second portion, the first portion may be represented by the solid line and the second portion may be represented by the dotted line. In another example, as illustrated in FIG. 15C, if the graphic object includes only the second portion, the graphic object may be represented by the dotted line.

As described above, the graphic object may be output in different ways depending on whether at least a portion of the target building is included in the image.

Figure 16:
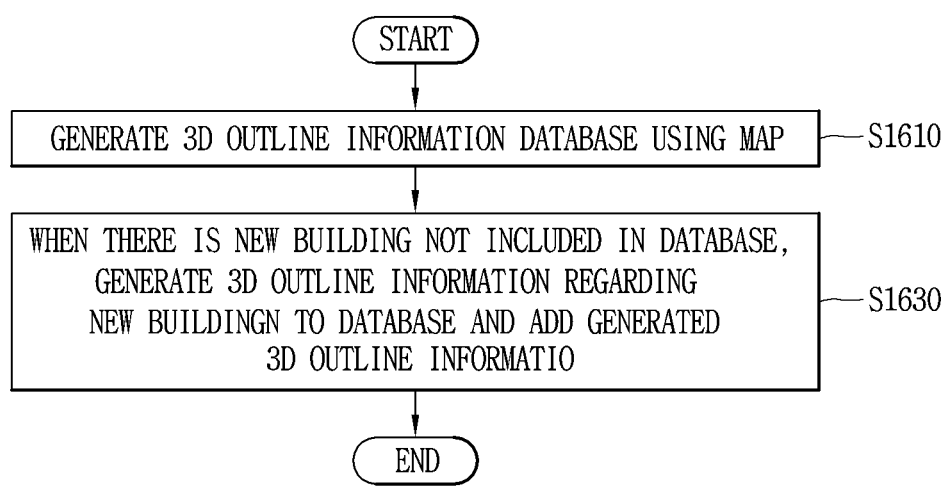
FIG. 16 is a flowchart for explaining a method for managing 3D outline information as a database.

FIG. 16 is a flowchart for explaining a method of managing 3D outline information as a database.

The processor may generate a 3D outline information database using a map (S1610).

The database is stored in the memory 830, and 3D outline information of a new building may be added or 3D outline information of an existing building may be edited or deleted.

If there is a new building not included in the database, the processor 870 may generate 3D outline information on the new building and add the 3D outline information to the database (S1630).

The 3D outline information database may be generated by an external server other than the image output device 800. In this case, the image output device 800 may transmit a position of the vehicle and the target building information to the external server, and may output a graphic object through the image output unit 850 based on the information received from the external server have. It is also possible to download at least a portion of the 3D outline information database from the external server.

When the map is updated, the 3D outline information is also updated, and thus, maintenance cost is not additionally incurred.

Meanwhile, the present invention may extend even to the vehicle 100 having the image output device 800 described above with reference to FIGS. 9 to 16.

The present invention described above may be implemented as a computer-readable code (or application or software) in a medium in which a program is recorded. The method for controlling an autonomous driving vehicle may be realized by a code stored in a memory, or the like.

The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

What is claimed is:

1. An image output device disposed at a vehicle, the image output device comprising:
    an image outputter; and
    a processor configured to:
        obtain a plurality of coordinate values that correspond to an object representing a building in a map,
        determine whether the building is located within a predetermined range from the vehicle,
        based on a determination that the building is located within the predetermined range from the vehicle, generate a graphic object that overlaps at least a portion of the building based on the coordinate values,
        output the graphic object through the image outputter,
        reconstruct the building in three dimensions through three-dimensional (3D) modeling using information provided by the map,
        generate 3D outline information based on pixel coordinates of the building in the information provided by the map, and
        output the graphic object to represent an outline shape of the building using the 3D outline information.

2. The image output device of claim 1, further comprising:
    a communicator configured to receive an image from a camera of the vehicle,
    wherein the processor is further configured to control the image outputter to output the graphic object to overlap with the image.

3. The image output device of claim 2, wherein the processor is further configured to generate the graphic object based on converting the coordinate values with respect to a first coordinate system defined by the image.

4. The image output device of claim 3, wherein the coordinate values are defined based on a three-dimensional (3D) coordinate system comprising three axes orthogonal to one another, and
    wherein the first coordinate system is a two-dimensional (2D) coordinate system comprising two axes orthogonal to each other.

5. The image output device of claim 4, wherein the two axes of the first coordinate system are configured to vary according to at least one of a position of the vehicle or a driving direction of the vehicle.

6. The image output device of claim 5, wherein the processor is further configured to define the first coordinate system based on a position of the camera installed at the vehicle.

7. The image output device of claim 2, wherein the processor is further configured to:
    identify vertices of the object corresponding to corners of the building from the map; and
    obtain the coordinate values corresponding to the vertices.

8. The image output device of claim 7, wherein the processor is further configured to:

obtain the graphic object based on the 3D outline information with respect to a position of the vehicle.

9. The image output device of claim 8, further comprising:
a memory configured to store the 3D outline information,
wherein the 3D outline information includes a central coordinate value of the building in the map and coordinate values of a plurality of vertices of the building in the map.

10. The image output device of claim 8, wherein the processor is further configured to:
based on the 3D outline information, search for a partial region of the image that includes at least a portion of the building, and
output the graphic object through the image outputter based on matching the graphic object to the partial region of the image.

11. The image output device of claim 10, wherein the processor is further configured to:
based on at least the portion of the building being included in the partial region of the image, control the image outputter to output the graphic object, and
based on at least the portion of the building being not included in the image, control the image outputter not to output the graphic object.

12. The image output device of claim 10, wherein the graphic object has a first portion corresponding to a first part of the building having an outline that is identified in the image and a second portion corresponding to a second part of the building having an outline that is not identified in the image, and
wherein the processor is further configured to output the first portion and the second portion in which the first portion and the second portion are distinguished from each other in the image outputter.

13. The image output device of claim 8, wherein the processor is further configured to determine the 3D outline information based on the image received from the camera.

14. The image output device of claim 2, wherein the processor is further configured to output the graphic object in different manners according to whether at least a portion of the building is included in the image.

15. The image output device of claim 1, wherein the graphic object includes a first quadrangle that represents a first side of the building and a second quadrangle that represents a second side of the building connected to the first side.

16. The image output device of claim 1, wherein the processor is further configured to adjust at least one of a shape of the graphic object or a size of the graphic object based on a position of the vehicle relative to a position of the building.

17. The image output device of claim 1, wherein the processor is further configured to select the building from among a plurality of buildings according to a preset condition.

18. The image output device of claim 1, wherein the image outputter is configured to output the graphic object to a windshield of the vehicle, and
wherein the processor is further configured to generate the graphic object by converting the coordinate values with respect to a coordinate system defined based on an eye position of an occupant in the vehicle.

19. The image output device of claim 1, further comprising:
a memory configured to store 3D outline information regarding a plurality of buildings,
wherein the processor is further configured to:
receive, from a server, map information including the map;
determine whether the map information includes information corresponding to a new building that is not stored in the memory; and
based on a determination that the map information includes the information corresponding to the new building that is not stored in the memory, generate 3D outline information regarding the new building and store the 3D outline information regarding the new building in the memory.

20. The image output device of claim 1, wherein the graphic object is a boundary line that surrounds an outline of the building.

* * * * *